United States Patent [19]

Nishimura

[11] Patent Number: 4,913,274
[45] Date of Patent: Apr. 3, 1990

[54] ELECTROMAGNETICALLY CONTROLLED SPRING CLUTCH MECHANISM

[75] Inventor: Kozo Nishimura, Akashi, Japan

[73] Assignee: Mita Industrial Co., Ltd., Osaka, Japan

[21] Appl. No.: 268,954

[22] Filed: Nov. 9, 1988

Related U.S. Application Data

[63] Division of Ser. No. 74,397, Jul. 16, 1987, Pat. No. 4,825,988.

[30] Foreign Application Priority Data

Jul. 31, 1986 [JP] Japan ............................ 61-178822

[51] Int. Cl.$^4$ .................... F16D 27/10; F16D 27/12
[52] U.S. Cl. ............................. 192/84 T; 192/41 S; 192/72; 192/48.92
[58] Field of Search ............... 192/84 T, 72, 41 S, 192/48.92

[56] References Cited

U.S. PATENT DOCUMENTS 3,315,773  4/1967  Aschauer .................... 192/84 T
4,638,899  1/1987  Kossett ....................... 192/84 T Primary Examiner—Leslie A. Braun
Assistant Examiner—David A. Testardi
Attorney, Agent, or Firm—Beveridge, DeGrandi & Weilacher

[57] ABSTRACT

An electromagnetically controlled spring clutch mechanism for transmitting the rotating forces of an input rotating element adapted to rotate in a predetermined direction and in a direction opposite thereto to an output rotating element. According to one aspect, a first spring clutch mechanism and a second spring clutch mechanism are interposed between the input rotating element and the output rotating element, and the rotating force of the input rotating element in the predetermined direction is transmitted to the output rotating element by the contraction of a coil spring in the first spring clutch mechanism and the rotating force of the input rotating element in the opposite direction is transmitted to the output rotating element by the contraction of a coil spring in the second spring clutch mechanism. According to a second aspect, an inside transmission and an outside transmission are disposed between the input rotating element and the outside rotating element; and the rotating force of the input rotating element in the predetermined direction is transmitted to the output rotating element via the inside transmission by the contraction of the coil spring, and the rotating force of the input rotating element in the opposite direction is transmitted to the output rotating element via the outside transmission by the expansion of the coil spring. According to a third aspect, a brake is disposed in relation to the output rotating element.

6 Claims, 7 Drawing Sheets

ELECTROMAGNETICALLY CONTROLLED SPRING CLUTCH MECHANISM

This application is a division of application Ser. No. 074,397, filed July 16, 1987, now U.S. Pat. No. 4,825,988.

FIELD OF THE INVENTION

This invention relates to an electromagnetically controlled spring clutch mechanism.

DESCRIPTION OF THE PRIOR ART

An electromagnetically controlled spring clutch mechanism utilizing a coil spring has long been used to transmit selectively the driving force of an input rotating element in rotation. One example of this type of electromagnetically controlled spring clutch mechanism is disclosed, for example, in Japanese Laid-Open Patent Publication No. 175633/1984. It comprises a shaft member, an input rotating element adapted to rotate as a unit with the shaft member, an output rotating element mounted rotatably on the shaft member, a rotor adapted to rotate as a unit with the shaft member, an armature assembly disposed on one side of the rotor and including an armature positioned opposite to the rotor, a supporting member mounted rotatably on the shaft member and a biasing spring member for biasing the armature in a direction away from the rotor, electromagnetic means for magnetically attracting the armature to the rotor against the elastic biasing action of the biasing spring member, and coil spring means having one end linked to the armature assembly and the other end linked to the output rotating element. When the electromagnetic means in this clutch mechanism is in the deenergized state, the driving force of the input rotating element is not transmitted to the output rotating element. When the electromagnetic means is energized the armature and the output rotating element are rotated relative to each other whereby the coil spring means contracts and the driving force of the input rotating element is transmitted to the output rotating element.

The aforesaid conventional electromagnetically controlled spring clutch mechanism is adapted to selectively transmit athe driving force of the input rotating element driven in a predetermined direction to the output rotating element, and it cannot be used to transmit the driving force of the input rotating element driven in a direction opposite to the predetermined direction to the output rotating element. It has been desired therefore to develop a novel electromagnetically controlled spring clutch mechanism for transmitting the aforesaid driving forces of the input rotating element which are driven in both directions to the output rotating element.

SUMMARY OF THE INVENTION

It is a main object of this invention to provide an excellent electromagnetically controlled spring clutch mechanism which can transmit the driving forces of an input rotating element driven in a predetermined direction and in a direction opposite thereto to an output rotating element.

Another object of this invention is to provide an excellent electromagnetically controlled spring clutch mechanism which is relatively small-sized and can properly transmit the driving forces of an input rotating element to an output rotating element with a simple structure.

Still another object of this invention is to provide an excellent spring clutch mechanism in which an output rotating element can be accurately kept from rotation when electromagnetic means is in the deenergized state.

Other objects and features of this invention will become apparent from the following description.

DETAILED DESCRIPTION OF PREFERRED EMBODIMENT

With reference to the accompanying drawings, embodiments of the electromagnetically controlled spring clutch mechanism constructed in accordance with this invention will be described in detail.

First Embodiment of the Electromagnetically Controlled Spring Clutch Mechanism With reference to FIGS. 1 to 7, a first embodiment of the electromagnetically controlled spring clutch mechanism of the invention will be described in detail.

Figure 1:
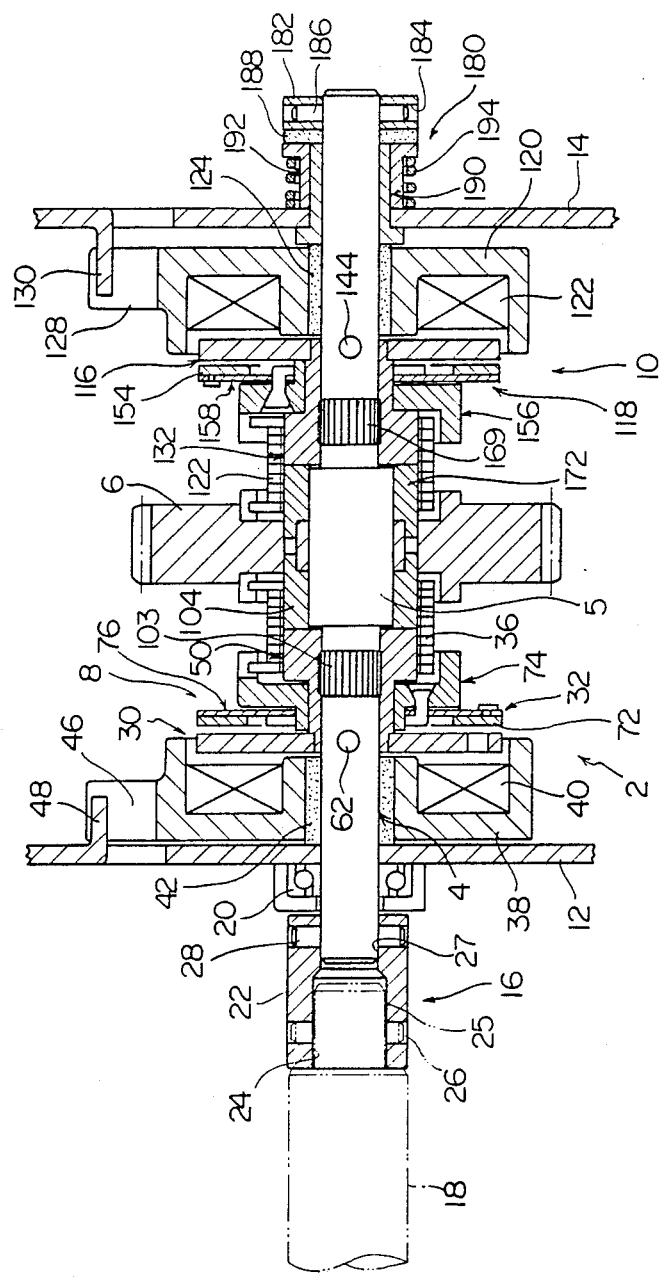
FIG. 1 a sectional view of a first embodiment of the electromagnetically controlled spring clutch mechanism constructed in accordance with this invention.

Mainly with reference to FIG. 1, an electromagnetically controlled spring clutch mechanism shown generally at 2 is provided with a shaft member 4 constituting an output rotating element, a gear 6 constituting an input rotating element, a first spring clutch mechanism 8 and a second spring clutch mechanism 10. As shown in FIG. 1, the shaft member 4 is rotatably mounted on supporting bases 12 and 14, for example. The gear 6, the first spring clutch mechanism 8 and the second spring clutch mechanism 10 are disposed between the supporting bases 12 and 14. An actuating shaft 18 (shown by a two-dot chain line in FIG. 1) is connected to the shaft member 4 via connecting means 16, for example. In the illustrated embodiment, one end portion of the shaft member 4 projects outwardly through the supporting base 12 (part of its projecting end portion is rotatably supported via a bearing 20). The connecting means 16 has a cylindrical connecting member 22. A receiving recess 24 having a relatively large diameter is provided in one end portion of the connecting member 22, and by positioning a small-diameter end portion 25 of the actuating shaft 18 in the receiving recess 24 and applying a fixing screw 26 to it, the connecting member 22 is linked to the actuating shaft 18. A receiving recess 27 having a relatively small diameter is formed in the other end portion of the connecting member 22 (in the specific embodiment, the receiving recess 24 and the receiving recess 27 communicate with each other), and by positioning the projecting end portion of the shaft member 4 in the receiving recess 27 and applying a fixing screw 28 to it, the connecting member 22 is linked to the shaft member 4. Fixing pins may be used instead of the fixing screws 26 and 28. Accordingly, when the shaft member 4 is rotated as will be described hereinbelow, the actuating shaft 18 is rotated as a unit with the shaft member 4 via the connecting means 16.

Now, with reference to FIGS. 1 and 2, the first spring clutch mechanism 8 and elements related to it will be described. In the illustrated embodiment, a large-diameter portion 5 is formed in the shaft member 4 substantially centrally between the supporting bases 12 and 14 in the axial direction. The gear 6 is rotatably mounted on the large-diameter portion 5. The first spring clutch mechanism 8 is disposed between the gear 6 and the supporting base 12. The second spring clutch mechanism 10 is disposed between the gear 6 and the supporting base 14.

The illustrated first spring clutch mechanism 8 comprises a rotor 30, an armature assembly 32, electromagnetic means 34 and coil spring means 36. The electromagnetic means 34 is arranged at one end portion of the shaft member 4, more specifically, inside of the supporting base 12. The illustrated electromagnetic means 34 has a field core 38 and an electromagnetic coil 40 mounted on the field core 38, and the field core 38 is rotatably mounted on the shaft member 4 via a sleeve member 42 (see FIG. 1). An engaging portion 44 is provided in the outer circumferential surface of the field core 38, and a cut 46 is formed in the engaging portion 44. On the other hand, part of the supporting base 12 is bent rearwardly to form an engaging protrusion 48 which is kept in engagement with the cut 46 of the engaging portion 44 (see FIG. 1). Hence, the electromagnetic means 34 is not rotated by the rotation of the shaft 4.

The rotor 30 and the armature assembly 32 are disposed on the shaft member 4 between the electromagnetic means 34 and the gear 6, namely inwardly of the electromagnetic means 34. In the illustrated embodiment, the rotor 30 and the armature assembly 32 are mounted in position on a first boss member 50, and the rotor 30, the armature assembly 32 and the first boss member 50 constitute a unit assembly.

Figure 2:
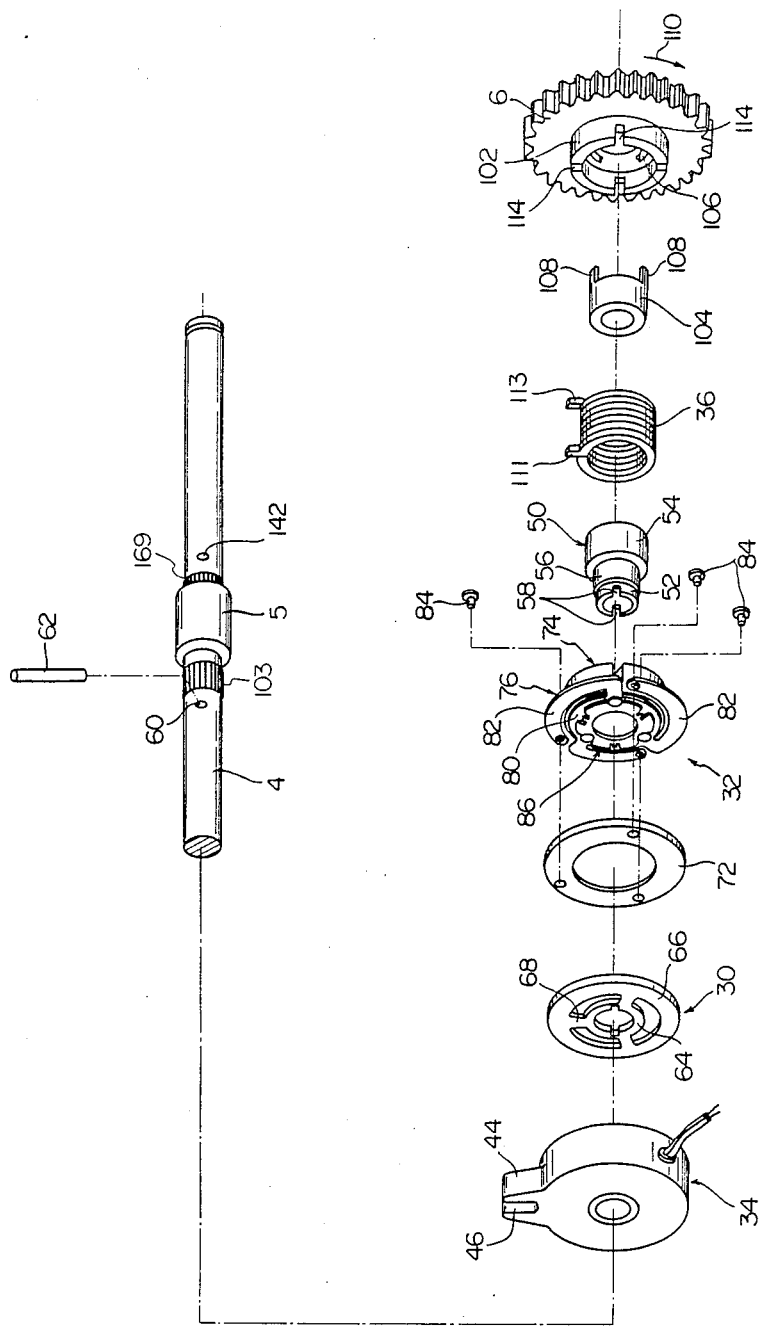
FIG. 2 an exploded perspective view showing a first spring clutch mechanism in the electromagnetically controlled mechanism shown in FIG. 1.
Figure 3:
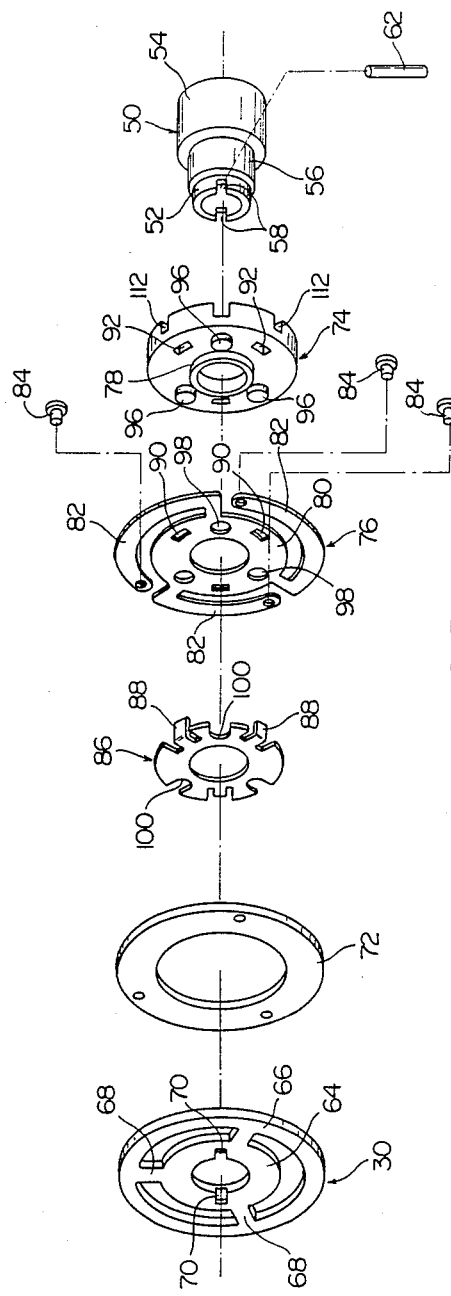
FIG. 3 is an exploded perspective view showing a unit assembly in the first spring clutch mechanism shown in FIG. 2.

With reference to FIG. 3 also, the first boss member 50 has a small-diameter portion 52 provided in its one end portion (the left end portion in FIGS. 1 to 3), a large-diameter portion 54 formed in the other end portion (the right end portion in FIGS. 1 to 3), and a medium-diameter portion 56 formed between them. A pair of cuts 58 defining a pin receiving portion are formed in the small-diameter portion 52 of the first boss member 50, and both end portions of a pin member 62 to be fitted in a pin hole 60 (FIG. 2) formed through the shaft member 4 are received in the cuts 58.

The illustrated rotor 30 has an annular base portion 64, an outside annular portion 66 disposed outwardly of the annular base portion 64 and a connecting portion 68 connecting the annular base portion 64 to the outside annular portion 66. When the annular base portion 64 is forced into the small-diameter portion 52 of the first boss member 50, the rotor 30 is fixed to one end of the first boss member 50 and rotates as a unit with it. In the illustrated embodiment, a pair of recesses 70 are formed in the inner circumferential edge of the annular base portion 64 of the rotor 30 in relation to the fact that the rotor 30 is fixed to the small-diameter portion 52 of the first boss member 50. The recesses 70 in cooperation with the cuts 58 formed in the first boss member 50 define a pin receiving portion, and both end portions of the pin member 62 mounted on the shaft member 4 are received in the cuts 58 and the recesses 70 as shown on an enlarged scale in FIG. 4. (Hence, when the rotor 30 is to be fixed to the small-diameter portion 52 of the first boss member 50, the recesses 70 of the rotor 30 are brought into alignment with the cuts 58 of the small-diameter portion 52 and then the annular base portion 64 of the rotor 30 is forced into the small-diameter portion 52 of the first boss member 50). According to this structure, even when the state of forcing the rotor 30 into the small-diameter portion 52 of the first boss member 50 is relatively weak, the rotor 30 is surely rotated as a unit with the shaft member 4 via the pin member 62.

The armature assembly 32 in the illustrated embodiment comprises an armature 72, a supporting rotating member 74 and a biasing spring member 76. The supporting rotating member 74 is formed of a short cylindrical material and is rotatably mounted on the medium-diameter portion 56 of the first boss member 50. An annular flange 78 is provided in the inner circumferential surface of one end surface (the left surface in FIGS. 1 to 4) of the supporting rotating member 74. Preferably, the supporting rotating member 74 is formed of a lightweight plastic material. The armature 72 is constructed of an annular plate having an outside diameter nearly equal to the outside diameter of the annular portion 66 of the rotor 30, and is mounted on the supporting rotating member 74 via the biasing spring member 76. The biasing spring member 76 is mounted on the annular flange 78 of the supporting rotating member 74 and its annular central portion 80 is fixed, as will be described hereinafter, to one end surface of the supporting rotating member 74. The illustrated biasing spring member 76 has a plurality of (three in the illustrated embodiment) projecting portions 82 extending in a sickle shape outwardly from the annular central portion 80. The free end portion of each of the projecting portions 82 is fixed to one surface of the armature 72 (that surface which is opposite to the surface facing the rotor 30) by a fixing member 84 such as a rivet. Hence, the armature assembly 32 is disposed on one side of the rotor 30, i.e. on the right side in FIG. 1, and the biasing spring member 76 elastically biases the armature 72 in a direction away from one surface of the rotor 30, i.e. from its right surface in FIG. 1.

As shown in the illustrated embodiment, the biasing spring member 76 is fixed to the supporting rotating member 74 in the manner to be described. The illustrated armature assembly 32 further includes a plate-like spring fixing member. The illustrated spring fixing member is constructed of an annular plate member 86 having a shape corresponding nearly to the shape of the annular central portion 80 of the biasing spring member 76. A plurality of (three in the illustrated embodiment) circumferentially spaced engaging protrusions 88 are formed in the peripheral edge portion of the plate member 86 by bending part of this peripheral edge portion. On the other hand a plurality of (three in the illustrated embodiment) rectangular insertion holes 90 corresponding respectively to the engaging protrusions 88 are formed in the annular central portion 80 of the biasing spring member 76. Furthermore, rectangular through-holes 92 corresponding respectively to the insertion holes 90 are formed in the supporting rotating member 74. Hence, when the biasing spring member 76 and the plate member 86 are mounted on the annular flange 78 of the supporting rotating member 74, the engaging protrusions 88 of the plate member 86 project to the other side (as shown by solid lines in FIG. 5) through the corresponding insertion holes 90 of the biasing spring member 76 and the corresponding through-holes 92 of the supporting rotating member 74. By deforming the projecting ends of the engaging protrusions 88 as is required and brought into engagement with the other end portion of the supporting rotating member 74, the annular central portion 80 of the biasing spring member 76 is maintained fixed between the plate member 86 and the supporting rotating member 74.

Figure 5:
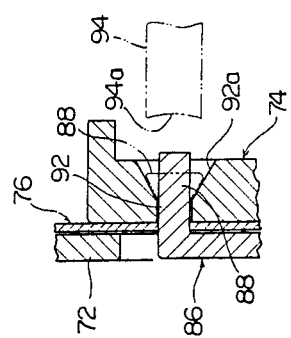
FIG. 5 is a partial enlarged sectional view for illustrating a method of fixing a biasing spring member in the unit shown in FIG. 3.
Figure 4:
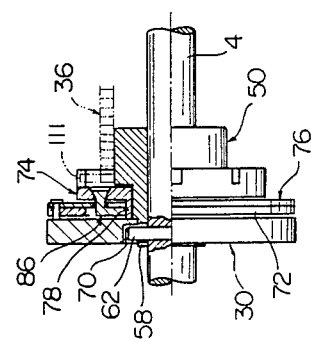
FIG. 4 is a sectional view showing, partly in section, the state of the unit assembly in the first spring clutch mechanism in FIG. 2 as mounted on a shaft member.

Engagement of the engaging protrusions 88 of the plate member 86 with the supporting rotating member 74 in the illustrated embodiment is preferably carried out as shown on an enlarged scale in FIG. 5. Preferably, as shown in FIG. 5, the right end portion (the right end portion in FIGS. 1 to 3 and 5) of each of the through-holes 92 of the supporting rotating member 74 is expanded to the right and the deformed portion of the engaging protrusion 88 is received in the expanded portion 92a of the through-hole 92. By dint of this structure, the assembly element composed of the supporting rotating member 74, the biasing spring member 76 and the plate member 86 can be reduced in size. When as in the illustrated embodiment, the expanded portion 92a is formed in the through-hole 92, it is desirable to make a pressing tool 94, such as a punch for deforming the engaging protrusions 88, in such a shape that its front end is formed in a concave shape and its front end surface 94a defines an arcuate surface. Thus, the projecting parts of the engaging protrusions 88 projecting as shown solid lines in FIG. 5 can be deformed by the action of the pressing tool 94 having such a shape, and the deformed portion of each engaging protrusion 88 can be accurately brought into engagement with the expanded portion 92a of the through-hole 92.

In the unit assembly in the illustrated embodiment, a plurality of (three in the illustrated embodiment) circumferentially spaced protrusions 96 are formed on one end surface of the supporting rotating member 74, and a plurality of circumferentially spaced circular openings 98 corresponding to the protrusions 96 and defining protrusion receiving portions are formed in the annular central portion 80 of the biasing spring member 76. The front end portions of the protrusions 96 each extend toward one surface of the rotor 30 through the openings 98 of the biasing spring member 76 and beyond the plate member 86 and the armature 72, and their front ends make contact with, or approach, one surface of the rotor 30. In the illustrated embodiment, semicircular cuts 100 corresponding to the openings 98 are formed in the peripheral edge portion of the plate member 86 in relation to the fact that the protrusions 96 extend as stated above. Thus, the protrusions 96 are received in the openings 98 and the cuts 100 and function to transmit the driving force between the supporting rotating member 74 and the biasing spring member 76 (in other words, they function to receive a radial load produced between the supporting rotating member 74 and the biasing spring member 76, namely a load in the rotating direction). At the same time, they function to improve the response characteristics of the first spring clutch mechanism 8, as will be described hereinafter. To further improve the response characteristics of the first spring clutch mechanism 8, it is preferred to cause the front end portion of the annular flange 78 of the supporting rotating member 74 to project beyond the biasing spring member 76 and the plate member 86 and its front end to contact or approach one surface of the rotor 30. In the illustrated embodiment, the front end surfaces of the protrusions 96 and the front end surface of the annular flange 78 form a substantially same plane substantially parallel to the one surface of the rotor 30.

In the illustrated embodiment, the unit& assembly is mounted properly on the shaft member 4 by forcing the first boss member 50 into the shaft member 4. In the illustrated embodiment, a part 103 of the shaft member 4 is knurled, and the first boss member 50 is forced into this part 103 so that its right end surface abuts against the left end surface of the large-diameter portion 5. Thus, the first boss member 50 is rotated as a unit with the shaft member 4.

With reference to FIGS. 1 and 2, an annular boss portion 102 is formed integrally in one surface (the left surface in FIGS. 1 and 2) of the gear 6, and a second cylindrical boss member 104 is fitted in the boss portion 102. In the illustrated embodiment, the second boss member 104 fitted rotatably as a unit with the gear 6 by inserting a pair of projecting portions 108 provided in its end surface into through-holes 106 (two through-holes in the illustrated embodiment) formed in the inner circumferential portion of the gear 6, or more specifically in a part inwardly of the boss portion 102. The second boss member 104 extends to the left in FIGS. 1 and 2 toward the first boss member 50. The second boss member 104 may be formed as an integral unit with the gear 6.

Coil spring means 36 is fitted over and across the first boss member 50 and the second boss member 104. The large diameter portion 54 of the first boss member 50 in the unit assembly extends toward the second boss member 104, and the end surfaces of the boss members 50 and 104 are in contact or in proximity with each other. The outside diameter of the large-diameter portion 54 of the first boss member 50 is substantially equal to the outside diameter of the second boss member 104, and in the illustrated embodiment, the coil spring means 36 is fitted over and across the large-diameter portion 54 of the first boss member 50 and the second boss member 104. In the illustrated embodiment, the coil spring means 36 is wound right-handedly as viewed from the left side in FIGS. 1 and 2. In this winding direction, when the gear 6 is rotated in the direction of an arrow 110 (FIG. 2) and a force to hamper rotation acts on the supporting rotating member 74 to produce a difference in rotating speed between the supporting rotating member 74 and the gear 6, the coil spring means 36 is contracted. One end 111 of the coil spring means 36 is connected to the supporting rotating member 74 by inserting the end 111 into one of a plurality of circumferentially spaced cuts 112 formed in the other end portion of the supporting rotating member 74. The other end 113 of the coil spring means 36 is connected to the annular boss portion 102 of the gear 6 by inserting it into any one of four circumferentially spaced cuts 114 formed in the annular boss portion 102.

Thus, when the electromagnetic means 34 is energized during the rotation of the gear 6 in the direction of arrow 110, the gear 6 and the armature assembly 32 are rotated relative to each other as will be described in detail hereinafter, whereby the coil spring means 36 is contracted, and the driving force from the gear 6 is transmitted to the shaft member 4 via the second boss member 104, the coil spring means 36 and the first boss member 50.

Figure 6:
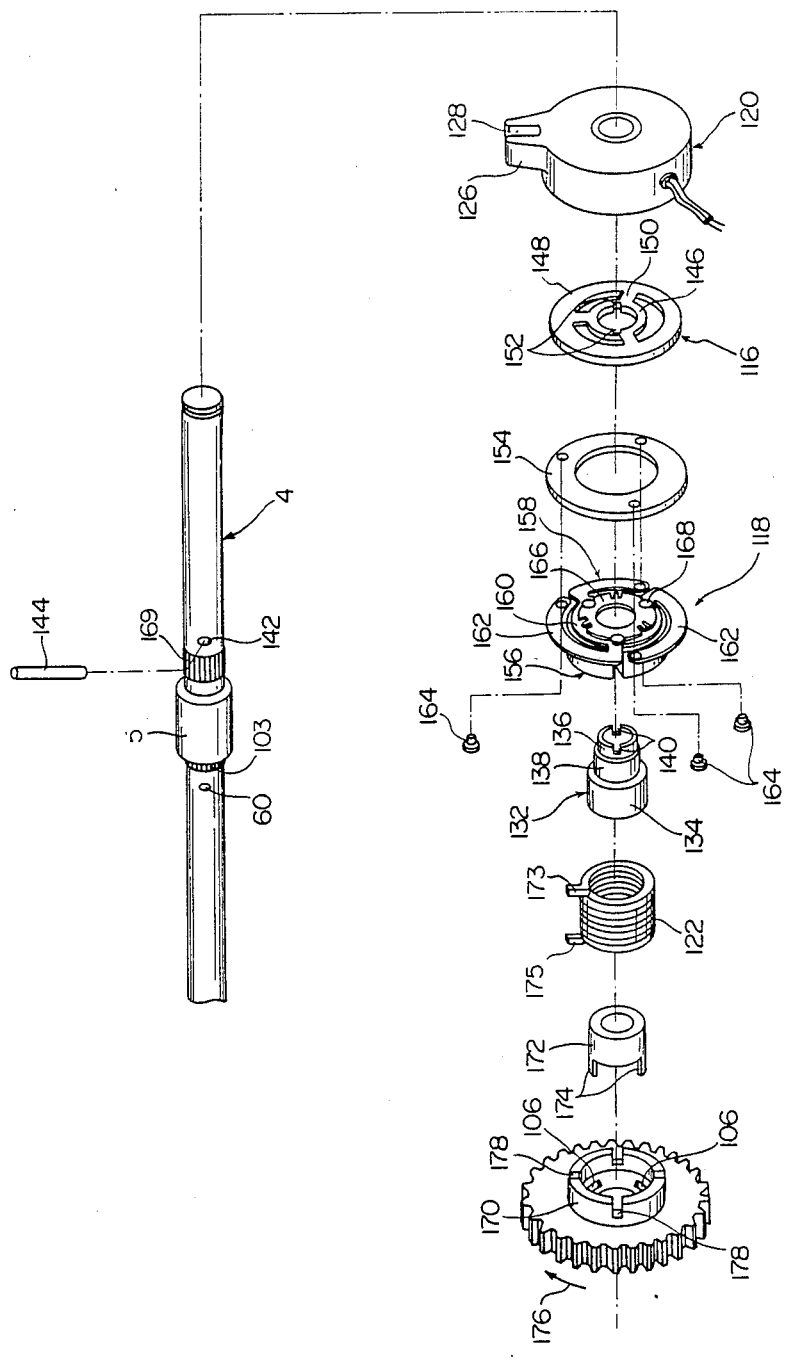
FIG. 6 is an exploded perspective view showing a second spring clutch mechanism in the first electromagnetically controlled spring clutch mechanism shown in FIG. 1.

Now, with reference to FIG. 6 taken in conjunction with FIG. 1, the second spring clutch mechanism 10 and elements related to it will be described. The second spring clutch mechanism 10 disposed between the gear 6 and supporting base 14 comprises a rotor 116, an armature assembly 118, electromagnetic means 120 and coil spring means 122. The structures of the rotor 116, armature assembly 118, electromagnetic means 120 and coil spring means 122 are substantially the same as those of the rotor 30, armature assembly 32, electromagnetic means 34 and coil spring means 36. Hence, the second spring clutch mechanism 10 will be described briefly.

The electromagnetic means 120 in the second spring clutch mechanism 10 is arranged at the other end portion of the shaft member 4, more specifically inside of the supporting base 14. The illustrated electromagnetic means 120 has a field core 120 and an electromagnetic coil 122 mounted on the field core 120, and the field core 120 is rotatably mounted on the shaft member 4 via a sleeve member 124 (see FIG. 1). An engaging portion 126 is provided on the peripheral surface of the field core 120, and a cut 128 is formed in the engaging portion 126. On the other hand, an engaging protrusion 130 is formed in the supporting base 14 by bending part of it rearwardly. The engaging protrusion 130 is engaged with the cut 128 of the engaging portion 126 (see FIG. 1). Hence, the electromagnetic means 120 is not rotated by the rotation of the shaft member 4.

The rotor 116 and the armature assembly 118 are disposed between the electromagnetic means 120 and the gear 6 on the shaft member 4, namely inwardly of the electromagnetic means 120. In the illustrated embodiment, the rotor 116 and the armature assembly 118 are mounted in position on a first boss member 132, and the rotor 116, the armature assembly 118 and the first boss member 132 constitute a unit assembly. The first boss member 132 has a large-diameter portion 134 formed in its one end portion (the left end portion in FIGS. 1 and 6), a small-diameter portion 136 formed in its other end portion (the right end portion in FIGS. 1 and 6) and a medium-diameter portion 138 provided between them. A pair of cuts 140 defining a pin receiving portion are formed in the small-diameter portion 136 of the first boss member 132, and both end portion of a pin member 144 to be fitted into a pin hole 142 (FIG. 6) extending through the shaft member 4 are received in the cuts 140. The illustrated rotor 116 has an annular base portion 146, an outside annular portion 148 disposed outwardly of the annular base portion 146, and a connecting portion 150 connecting the annular base portion 146 to the outside annular portion 148. The rotor 116 is fixed to one end of the first boss member 132 by forcing the annular base portion 146 into the small-diameter portion 136 of the first boss member 132, and rotates as a unit with the first boss member 132. In the illustrated embodiment, a pair of recesses 152 are formed in the inner circumferential edge of the annular base portion 146 of the rotor 116. The recesses 152 formed in the rotor 116 in cooperation with the cuts 140 formed in the first boss member 132 define a pin receiving portion. Both end portions of the pin member 144 fitted in the shaft member 4 are received in the cuts 140 and the recesses 152 (therefore when the rotor 116 is to be fixed to the small-diameter portion 136 of the first boss member 132, the recesses 152 of the rotor 116 and the cuts 140 of the small-diameter portion 136 are brought into alignment with each other and then the rotor 116 is forced into the small-diameter portion 136). The armature assembly 118 in the illustrated embodiment includes an armature 154, a supporting rotating member 156 and a biasing spring member 158. The supporting rotating member 156 is formed of a short cylindrical material, and is rotatably mounted on the medium-diameter portion 138 of the first boss member 132. An annular flange (FIG. 1) is provided in the inner circumferential edge of the end surface (the right surface in FIG. 1) of the supporting rotating member 156. The armature 154 is formed of an annular plate having an outside diameter nearly equal to the outside diameter of the outside annular portion 148 of the rotor 116, and mounted on the supporting rotating member 156 via the biasing spring member 158. The biasing spring member 158 is mounted on the annular flange of the supporting rotating member 156, and its annular central portion 160 is fixed in position to the end surface of the supporting rotating member 156. The illustrated biasing spring member 158 has a plurality of (three in the illustrated embodiment) extending in a sickle shape outwardly from the annular central portion 160. The free end portion of each of the projecting portions 162 is fixed to one surface (the left surface in FIGS. 1 and 6 opposite to ths surface which faces the rotor 116) of the armature 154 by a fixing member 164 such as a rivet. Hence, in the second spring clutch mechanism 10, too, the armature assembly 118 is disposed on one side of the rotor 116 (namely on the left in FIG. 1), and the biasing spring member 158 elastically biases the armature 154 in a direction away from one surface (the left surface in FIG. 1) of the rotor 116. In the second spring clutch mechanism 10, too, the biasing spring member 158 is preferably fixed in place to the supporting rotating member 156 by the annular plate member 166 constituting a spring fixing member as is the case with the first spring clutch mechanism 8.

It is preferred to provide a plurality of protrusions 168 extending toward one surface of the rotor 116 in circumferentially spaced-apart relationship on the end surface of the supporting rotating member 156 as is the case with the first spring clutch mechanism 8. Preferably, the front end of an annular flange provided in the supporting rotating member 156 is kept in contact or in proximity with the aforesaid one surface of the rotor 116.

In the illustrated embodiment, the unit assembly is mounted in position on the shaft member 4 by forcing the first boss member 132 into the shaft. In the illustrated embodiment, a part 169 of the shaft member 4 is knurled, and the first boss member 132 is forced into the knurled part 169 so that its left end surface abuts against the right end surface of the large-diameter portion 5. Thus, the first boss member 132 rotates as a unit with the shaft member 4.

An annular boss portion 170 is provided integrally on the other surface (the right surface in FIGS. 1 and 6) of the gear 6, and a second boss member 172, cylindrical in shape, is fitted in the boss portion 170. In the illustrated embodiment, the second boss member 172 is mounted so as to rotate as a unit with the gear 6 by inserting a pair of projecting portions 174 formed on its end surface into the through-hole 106 formed in the gear 6 from the other side of the gear 6. The second boss member 172 extends to the right in FIGS. 1 and 6 toward the first boss member 132. The second boss member 172 can also be formed as an integral unit with the gear 6.

Coil spring means 122 is fitted over and across the first boss member 132 and the second boss member 172. The large-diameter portion 134 of the first boss member 132 in the unit assembly in the second spring clutch mechanism 10 extends toward the second boss member 172, and the end surfaces of the boss members 132 and 172 are kept in contact or in proximity with each other. The outside diameter of the large-diameter portion 134 of the first boss member 132 is substantially equal to the outside diameter of the second boss member 172. In the illustrated embodiment, the coil spring means 122 is fitted over and across the large-diameter portion 134 of the first boss member 132 and the second boss member 172. In the illustrated embodiment, the coil spring means 122 is wounded right-handedly as viewed from the right side in FIGS. 1 and 6. In this winding direction, when the gear 6 is rotated in the direction shown by an arrow 176 (FIG. 6) and a force to hamper rotation acts on the supporting rotating member 156 to produce a difference in rotating speed between it and the gear 6, the coil spring means 122 is contracted. One end 173 of the coil spring means 122 is connected to the supporting rotating member 156 by inserting it into any one of a plurality of circumferentially spaced cuts formed in the other end portion of the supporting rotating member 156. The other end 175 of the supporting rotating member 156 is connected to the gear 6 by inserting it into any one of four circumferentially spaced cuts 178 formed in the annular boss portion 170 of the gear 6.

Accordingly, when the electromagnetic means 120 is energized during the rotation of the gear 6 in the direction of arrow 176, the gear 6 and the armature assembly 118 are rotated relative to each other whereby the coil spring means 122 is contracted and the driving force from the gear 6 is transmitted to the shaft member 4 via the second boss member 172, the coil spring means 122 and the first boss member 132.

In the electromagnetically controlled spring clutch mechanism 2 described above, the armature assemblies 32 and 118 are disposed respectively on one side of the rotors 30 and 116 in the first spring clutch mechanism 8 and the second spring clutch mechanism 10, and the electromagnetic means 34 and 120 are disposed on the other side of the rotors 30 and 116 respectively. The various constituent elements in the first spring clutch mechanism 8 are substantially symmetrical with the various constituent elements of the second spring clutch mechanism 10 with respect to the gear 6 in the axial direction of the shaft member 4. Specifically, in the first spring clutch mechanism 8, the second boss member 104, the coil spring member means 36, the first boss member 50, the armature assembly 32, the rotor 30 and the electromagnetic means 34 are arranged from one side of the gear 6 to the left in FIG. 1. In the second spring clutch mechanism 10, the second boss member 172, the coil spring means 122, the first boss member 132, the armature assembly 118, the rotor 116 and the electromagnetic means 120 are arranged from the other side of the gear 6 to the right in FIG. 1.

The electromagnetically controlled spring clutch mechanism 2 further includes brake means 180 in relation to the shaft member 4 in order to prevent accurately the driving force of the gear 6 from being transmitted directly to the shaft member 4 owing to a frictional force generated between the gear 6 and the shaft member 4, etc. to rotate the shaft member 4 when the electromagnetic means 34 and 120 are in the deenergized state. The brake means 180 will be described in detail hereinafter.

Now, with reference to FIGS. 1, 2 and 6, the operation and effect of the electromagnetically controlled spring clutch mechanism 2 will be described.

First, let us assume that the gear 6 is rotated in a predetermined direction shown by arrow 110 (FIG. 2). In this case, the electromagnetic means 34 of the first spring clutch mechanism 8 is energized and deenergized whereby the driving force of the gear 6 is selectively transmitted to the shaft member 4 constituting an output element.

Specifically, when the electromagnetic means 34 is energized during the rotation of the gear 6 in the direction of arrow 110 the armature 72 moves to the left in FIG. 1 against the elastic biasing action of the biasing spring member 76 and is attracted magnetically to one surface of the rotor 30 by the magnetic attracting force of the electromagnetic means 34. As a result, the armature 72 is kept in connection with the rotor 30. In the meantime, the gear 6 continues to rotate in the direction of arrow 110 (FIG. 2) and the supporting rotating member 74 also rotates in the same direction via the coil spring means 36 (the biasing spring members 76 and the armature 72 are rotated as a unit with the supporting rotating member 74). Therefore, when the armature 72 and the rotor 30 are kept in connection as a result of magnetic attraction, a force to hamper rotation acts on the supporting rotating member 74. Consequently, the rotation hampering force produces a difference in rotating speed between the gear 6 and the supporting rotating member 74, and the coil spring means 36 is contracted owing to this difference in speed. This in turn causes connection of the second boss member 104 and the first boss member 50 via the coil spring means 36, and the shaft member 4 is drivingly connected to the gear 6 via the first boss member 50, the coil spring means 36 and the second boss member 104. The rotating force of the gear 6 in the direction of arrow 110 is, thus transmitted to the shaft member 4 and the actuating shaft 18 connected to it is rotated in the direction of arrow 110 incident to the rotation of the gear 6.

On the other hand, when the electromagnetic means 34 is deenergized, the elastic biasing action of the biasing spring member 76 moves the armature 72 to the right in FIG. 1 away from the aforesaid one surface of the rotor 30, and the above connection between the armature 72 and the rotor 30 is cancelled. In other words, the armature 72 is returned to the position shown in FIG. 1 by the action of the biasing spring member 76. Since at the time of returning, the armature 72 is moved away from one surface of the rotor 30 by the action of the biasing spring member 76 interposed between the supporting rotating member 74 and the armature 72, the connection of the armature 72 to the rotor 30 is rapidly cancelled. During this returning, the armature 72 tends to be slightly inclined to the shaft member 4 owing to a space existing between the outside diameter of the medium diameter portion 56 of the first boss member 50 and the inside diameter of the supporting rotating member 74. Since, however, the protrusions 96 formed on one end surface of the supporting rotating member 74 are kept in contact or in proximity with one surface of the rotor 30, the front end surfaces of the protrusions 96 of the supporting rotating member 74 come into contact with one surface of the rotor 30 in the event of some tilting of the armature 72, and the reduction of response characteristics due to contact of the armature 72 with one surface of the rotor 30 is effectively prevented. Furthermore, since the front end of the annular flange 78 of the supporting rotating member 74 is kept in contact or in proximity with one surface of the rotor 30 in the illustrated embodiment, the so-called "play" of the supporting rotating member 74 itself can also be suppressed, and the reduction of response characteristics is further prevented. When the connection between the armature 72 and the rotor 30 is cancelled, the supporting rotating member 74 is slightly rotated in the direction of arrow 110 by the elastic force of the coil spring means 36 which is created during transmission of the driving force, and the coil spring means 36 is expanded. During the expansion of the coil spring means 36, the supporting rotating member 74 is rotatably mounted on the first boss member 50, and only the biasing spring member 76, the armature 72 and the plate member 86 are mounted on the supporting rotating member 74. Hence, the supporting rotating member 74 is easily and rapidly rotated as is required by the elastic force of the coil spring means 36 without undergoing high resistance. When the coil spring means 36 is expanded as above, the connection between the second boss member 104 and the first boss member 50 by the coil spring means 36 is cancelled, and the driving connection between the gear 6 and the shaft member 4 is cancelled. It will be readily seen that at the time of deenergization of the electromagnetic means 34, only the supporting rotating member 74, the biasing spring member 76 and the armature 72 rotate via the coil spring means 36 incident to the rotation of the gear 6. When the gear 6 is rotated in the direction of arrow 110, the electromagnetic means 120 of the second spring clutch mechanism 10 is not energized. Accordingly, in the second spring clutch mechanism 10, only the supporting rotating member 156, the biasing spring member 158 and the armature 154 rotate via the coil spring means 122 incident to the rotation of the gear 6 in the direction of arrow 110.

When, conversely, the gear 6 is rotated in the direction shown by arrow 176 (FIG. 6), the electromagnetic means 120 of the second spring clutch mechanism 10 is energized and deenergized to thereby transmit the driving force of the gear 6 selectively to the shaft member 4.

When the electromagnetic means 120 is energized during the rotation of the gear 6 in the direction of arrow 176, the armature 154 is moved to the right in FIG. 1 against the elastic biasing action of the biasing spring member 158 and magnetically attracted to one surface of the rotor 116 by &he magnetic attraction of the electromagnetic means 120, whereby the armature 154 and the rotor 116 are kept in connection. As a result, a difference in rotating speed arises between the gear 6 and the supporting rotating member 156, and the coil spring means 122 is contracted owing to this speed difference. Upon the contraction of the coil spring means 122, the second boss member 172 and the first boss member 132 are connected to each other via the coil spring means 122, and the shaft member 4 is drivingly connected to the gear 6 via the first boss member 132, the coil spring means 122 and the second boss member 172. Thus, the rotating force of the gear 6 in the direction of arrow 176 is transmitted to the shaft member 4, and the shaft member 4 and the actuating shaft 18 connected to it are rotated in the direction of arrow 176 incident to the rotation of the gear 6.

On the other hand, when the electromagnetic means 120 is deenergized, the armature 154 is moved to the left in FIG. 1 away from one surface of the rotor 116 by the elastic biasing action of the biasing spring member 158, and the above connection between the armature 154 and the rotor 116 is cancelled (namely, the armature 154 is returned to the position shown in FIG. 1 by the action of the biasing spring member 158). Consequently, the supporting rotating member 156 is further rotated slightly in the direction of arrow 176 by the elastic force of the coil spring means 122 which is created during the aforesaid transmission of the driving force. The coil spring means 122 is thus expanded, and the connection between the second boss member 172 and the first boss member 132 by the coil spring means 122 is cancelled. As a result, the driving connection between the gear 6 and the shaft member 4 is cancelled. It will be readily understood that during the deenergization of the electromagnetic means 120, only the supporting rotating member 156, the biasing spring member 158 and the armature 154 rotate via the coil spring means 122 incident to the rotation of the gear 6. Hence, in the second spring clutch mechanism 10, the same effect as in the first spring clutch mechanism 8 is achieved. Since the electromagnetic means 34 of the first spring clutch mechanism 8 is not energized during the rotation of the gear 6 in the direction of arrow 176, only the supporting rotating member 74, the biasing spring member 76 and the armature 72 rotate via the coil spring means 36 incident to the rotation of the gear 6 in the direction of arrow 176 in the first spring clutch mechanism 8.

In the electromagnetically controlled spring clutch mechanism 2, the rotors 30 and 116, the armature assemblies 32 and 118, and the first boss members 50 and 132 in the first spring clutch mechanism 8 and the second spring clutch mechanism 10 are respectively constructed as unit assemblies. Hence, the number of assembly elements can be small, and the distance between the rotor 30 and the armature 72 and the distance between the rotor 116 and the armature 158, which are particularly important, can be maintained constant. Furthermore, since the armatures 72 and 154 are fixed respectively to one end surface of the supporting rotating member 74 and one end surface of the supporting rotating member 156 by the plate members 86 and 166 via the biasing spring members 76 and 158, the plate members 86 and 166 act substantially uniformly on nearly the entire areas of the annular central portions 80 and 160 of the armatures 72 and 154 respectively. Hence, the annular central portions 80 and 160 can be accurately fixed between the plate member 86 and the supporting rotating member 74 and between the plate member 166 and the supporting rotating member 156 respectively, and assembly elements consisting of the biasing spring members 76 and 158, the supporting rotating members 74 and 156 and the plate members 86 and 166, respectively, can be reduced in size. Furthermore, deformation of the armatures 72 and 154 incident to the fixation of to the supporting rotating members 74 and 156 can be prevented, and &his improves response characteristics.

In the illustrated electromagnetically controlled spring clutch mechanism 2, the first boss member 50 in the first spring clutch mechanism 8 is forced into the shaft member 4 from one side of the shaft member 4 and abuts against one end surface of the large-diameter portion 5, and the fist boss member 132 in the second spring clutch mechanism 10 is forced into the shaft member 4 from the other side of the shaft member 4 and abuts against the other end surface of the large-diameter portion 5. Hence, the relatively movement of the first boss members 50 and 132 and the second boss members 104 and 172 and the gear 6 disposed between the first boss members 50 and 132 to the shaft member 4 is accurately hampered. Furthermore, even when the electromagnetically controlled spring clutch mechanism 2 is disposed longitudinally (the shaft member 4 is disposed longitudinally), the spaces between various constituent elements do not gather at one place because of the provision of the large-diameter portion 5. Therefore, the coil spring means 36 and 122 are accurately prevented from partly intruding between the first boss member 50 and the second boss member 104 and between the first boss member 132 and the second boss member 172, respectively.

Figure 7:
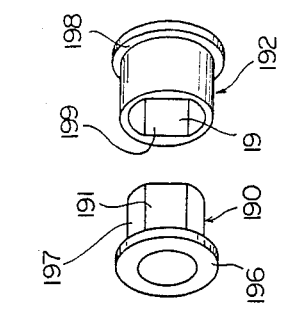
FIG. 7 is a perspective view showing a sleeve member and a rotation hampering member in brake means in the electromagnetically controlled spring clutch mechanism show FIG. 1.

Now, with reference to FIGS. 1 and 7, the brake means 180 in the illustrated embodiment will be described. The illustrated brake means 180 includes a rotating member 182. The other end portion of the shaft member 4 projects outwardly through the supporting base 14, and the rotating member 182 in the form of a short cylinder is mounted on the projecting end of the shaft member 4. In the illustrated embodiment, a through-hole 184 is formed in the rotating member 182, and the rotating member 182 is fixed to the shaft member 4 by forcing a pin member 186 into the through-hole 184 and a hole (not shown) formed in the shaft member 4. Hence, the rotating member 182 rotates as a unit with the shaft member 4. In the illustrated embodiment, a friction member 188 formed of a material having a high coefficient of friction, such as artificial leather or synthetic rubber, is bonded to the inner surface of the rotating member 182 (i.e., the surface facing the supporting base 14).

The other end portion of the shaft member 4 is supported by the supporting base 14 via a sleeve member 190. A flange portion 196 is provided integrally at one end of the sleeve member 190. The sleeve member 190 is mounted on the supporting base 14 so that the flange portion 196 is positioned inwardly of the supporting base 14, more specifically between the supporting base 14 and the electromagnetic means 120. The main sleeve body 197 extends outwardly through an opening formed in the supporting base 14. As clearly shown in FIG. 7, a pair of opposite flat surfaces 191 (only one of which is shown in FIG. 7) are formed on the outside surface of the main sleeve body 197, and an opening having a shape corresponding to the outside shape of the vertical sectional surface of the main sleeve body 197 is formed in the supporting base 14. Accordingly, when the main sleeve body 197 is positioned in the above opening, the sleeve member 190 does not rotate relative to the supporting base 14.

The brake means 180 further includes a braking member 192 which is formed of a sleeve-like member. In the braking member 192 a through-hole 199 having a shape corresponding to the outside shape of the longitudinal sectional surface of the main sleeve body 197 is formed. In the inner surface defining the through-hole 199 of the braking member 192, a pair of flat surfaces 193 corresponding to the pair of flat surfaces 191 in the outer circumferential surface of the main sleeve body 197 are formed. The braking member 192 is mounted outwardly of the main sleeve body 197 of the sleeve member 190. It will be readily seen therefore that the braking member 192 does not rotate relative to the sleeve member 190, but can freely move axially of the sleeve member 190, namely in the left-right direction in FIG. 1. In the illustrated embodiment, a flange portion 198 having a shape corresponding to the outside shape of the rotating member 182 is formed integrally at the right end of braking member 192. A coil spring 194 (constituting biasing means) is disposed across the flange portion 198 and the supporting base 14 over the braking member 192. The coil spring 194 acts on the flange portion 198 and biases the braking member 192 toward the rotating member 182, namely to the right in FIG. 1. Hence, the end surface of the flange portion 198 of the braking member 192 is brought into elastic press contact with the surface of the friction member 188 provided on the inner surface of the rotating member 182 by the action of the coil spring 194. In the illustrated embodiment, the friction member 188 is provided in the rotating member 182. Alternatively, the friction member may be provided in the braking member 192 or both in the rotating member 182 and the braking member 192.

In the absence of the brake means 180, the shaft member 4 tends to rotate when the electromagnetic means 34 and 120 are in the deenergized state. When the coefficient of friction between the gear 6 and the shaft member 4 is high, the rotating force of the gear 6 is directly transmitted to the shaft member 4 during the deenergization of the electromagnetic means 34 and 120. The relatively small force so transmitted is likely to rotate the shaft member 4. This tendency depends upon the frictional force between &he gear 6 and the shaft member 4, or in other words, upon the coefficient of friction between the gear 6 and the shaft member 4, and a load on the gear 6 in its radial direction (in the direction substantially perpendicular to the axis of the shaft member 4).

In contrast, when the brake 180 is provided in relation to the shaft member 4 in the illustrated embodiment, the rotation of the shaft member 4 by the relatively weak force can be accurately hampered by the action of the brake means 180, namely by the frictional force between the rotating member 182 and the braking member 192. As a result, the rotation of the shaft member 4 during the deenergization of the electromagnetic means 34 and 120 can be accurately prevented. In the illustrated embodiment, the friction member 188 is interposed between the rotating member 182 and the braking member 192, and the rotating member 182 and the braking member 192 are kept in press contact by the action of the coil spring 194. Hence, the rotation of the shaft member 4 during the deenergizaton of the electromagnetic means 34 and 120 can be more accurately prevented.

The brake means 180 described above is not limited to the illustrated electromagnetically controlled spring clutch mechanism 2, and can likewise be applied to other known electromagnetically controlled spring clutch mechanisms.

Figure 9:
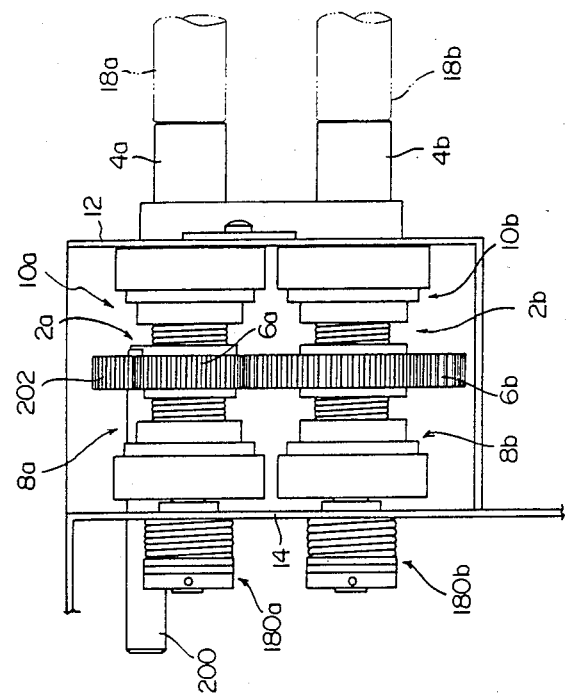
FIG. 9 is a view taken on line IX—IX, in FIG. 8.
Figure 8:
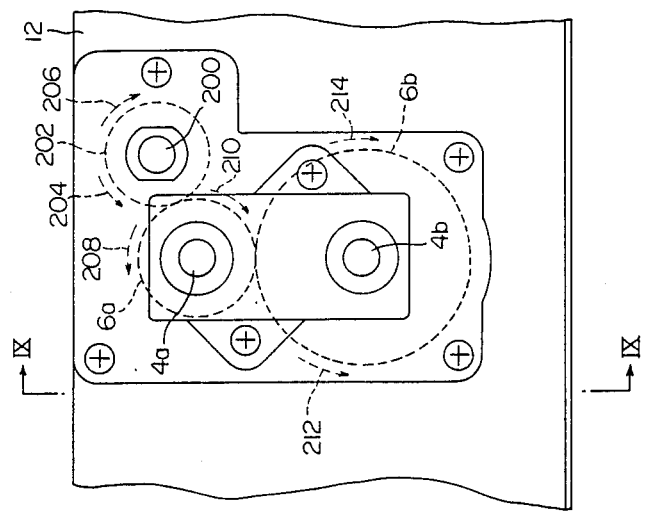
FIG. 8 is a side elevation showing one example o application of the first embodiment of the electromagnetically controlled spring clutch mechanism shown in FIG. 1.

Example of Application of the First Embodiment of the Electromagnetically Controlled Spring Clutch Mechanism The first embodiment of the electromagnetically controlled clutch mechanism described above can, for example, be conveniently applied to a massager machine as shown in FIGS. 8 and 9. In FIGS. 8 and 9, two electromagnetic spring clutch mechanisms 2a and 2b are disposed at a predetermined interval between the supporting bases 12 and 14. Each of the electromagnetically controlled spring clutch mechanisms 2a and 2b is of substantially the same structure as the electromagnetically controlled spring clutch mechanism 2 shown in FIGS. 1 to 7, and its detailed description is omitted here.

A rotating shaft 200 is rotatably mounted between the supporting bases 12 and 14. A gear 202 is mounted on the rotating shaft 200. The gear 202 is in mesh with a gear 6a in one electromagnetically controlled clutch mechanism 2a, and the gear 6a is in mesh with a gear 6b in the other electromagnetically controlled spring clutch mechanism 2b. The rotating shaft 200 is drivingly connected to a driving source (not shown) such as an electric motor capable of being rotated in a normal and a reverse direction. Hence, when as shown in FIG. 8 the rotating shaft 200 is rotated in the direction shown by an arrow 204 by the normal rotation of the driving source (not shown), the gear 6a is rotated in the direction shown by an arrow 210 via the gear 202, and the gear 6b is further rotated in a direction shown by an arrow 212. On the other hand, when the rotating shaft 200 is rotated in a direction shown by an arrow 206 by the reverse rotation of the driving source (not shown), the gear 6a is rotated in the direction of arrow 208 via the gear 202 and the gear 6b is rotated in the direction shown by an arrow 214.

As will be easily understood from the foregoing description, in the illustrated combined clutch mechanism, when the rotating shaft 200 is rotated in the direction of arrow 204, a first spring clutch mechanism 8a in the electromagnetically controlled spring clutch mechanism 2a and a second spring clutch mechanism 10b in the other electromagnetically controlled clutch mechanism 2b are energized and deenergized (at this time, a second spring clutch mechanism 10a in the electromagnetically controlled spring clutch mechanism 2a and a first spring clutch mechanism 8b in the other electromagnetically controlled spring clutch mechanism 2b are not energized). When the rotating shaft 200 rotates in the direction of arrow 206, a second spring clutch mechanism 10a in one electromagnetically controlled spring clutch mechanism 2a and the first spring clutch mechanism 8b in the other electromagnetically controlled spring clutch mechanism 2b are energized and deenergized (at this time, the first spring clutch mechanism 8a in the electromagnetically controlled spring clutch mechanism 2a and the second spring clutch mechanism 10b in the other electromagnetically controlled spring clutch mechanism 2b are not energized). In the illustrated embodiment, the gear 6a and the gear 6b are in mesh with each other so that they rotate in opposite directions. The gears 6a and 6b may be drivingly connected such that they rotate in the same direction. For example, when an idler gear is interposed between the gear 6a and the gear 6b, the first spring clutch mechanisms 8a and 8b in the electromagnetically controlled spring clutch mechanisms 2a and 2b are energized and deenergized during the rotation of the rotating shaft 200 in the direction of arrow 204 (at this time, the second spring clutch mechanisms 10a and 10b in the electromagnetically controlled spring clutch mechanisms 2a and 2b are not energized). When the rotating shaft 200 is rotated in the direction of arrow 206, the second spring clutch mechanisms 10a and 10b are energized and deenergized (at this time, the first spring clutch mechanisms 8a and 8b are not energized).

When the first spring clutch mechanism 8a in the electromagnetically controlled spring clutch mechanism 2a is energized during the rotation of the rotating shaft 200 in the direction of arrow 204, the rotating force of the gear 6a in the direction of arrow 210 is transmitted to the shaft member 4a via the first spring clutch mechanism 8a, and an actuating shaft 18a is rotated in the direction of arrow 210. When the second spring clutch mechanism 10b of the electromagnetically controlled spring clutch mechanism 2b is energized at the above-mentioned time, the rotating force of the gear 6b in the direction of arrow 212 is transmitted to the shaft member 4b via the second spring clutch mechanism 10b, and an actuating shaft 18b rotates in the direction of arrow 212.

When the second spring clutch mechanism 8b of the electromagnetically controlled spring clutch mechanism 2a is energized during the rotation of the rotating shaft 200 in the direction of arrow 206, the rotating force of the gear 6a in the direction of arrow 208 is transmitted to the shaft member 4a via the first spring clutch mechanism 8b, and the actuating shaft 18b is rotated in the direction of arrow 208. When the first spring clutch mechanism 10a of the clutch mechanism 2b is energized, the rotating force of the gear 6b in the direction of arrow 214 is transmitted to the shaft member 4b via the first spring clutch mechanism 10a. and the actuating shaft 18b is rotated in the direction of arrow 214.

When the first spring clutch mechanism 8a (or 8b) and the second spring clutch mechanisms 10a (or 10b) of the electromagnetically controlled spring clutch mechanism 2a (or 2b) are in the deenergized state, the shaft member 4a (or 4b) is not rotated by the rotation of the gear 6a (or 6b) because brake means 180a (or 180b) acts on the shaft member 4a (or 4b).

Second Embodiment of the Electromagnetically Controlled Spring Clutch Mechanism

Now, with reference to FIGS. 10 and 11, a second embodiment of the electromagnetically controlled spring clutch mechanism constructed in accordance with this invention will be described.

Figure 10:
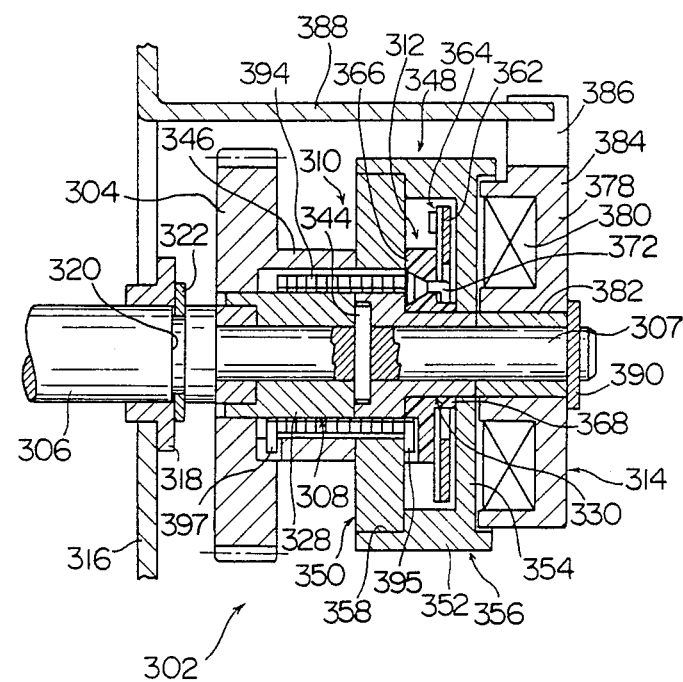
FIG. 10 is a sectional view showing a second embodiment of the electromagnetically controlled spring clutch mechanism constructed in accordance with this invention.

With reference to FIG. 10, an electromagnetically controlled spring clutch mechanism shown generally at 302 is provided with a gear 304 constituting an input rotating element, a shaft member 306 constituting an output rotating element, inside transmission means 308 and outside transmission means 310 interposed between the gear 304 and the shaft member 306, an armature assembly 312 and electromagnetic means 314.

The shaft member 306 is rotatably supported between a pair of supporting plates 316 (one of which is shown in FIG. 10) via a bearing member 318. One end portion of the shaft member 306 projects outwardly through the supporting plate 316, and part of the projecting portion has a slightly smaller diameter. In the illustrated embodiment, an engaging groove 320 is formed in the projecting portion of the shaft member 306, and an engaging member 322 for preventing detachment of the bearing member 318 is engaged with the engaging groove 320.

The gear 304 is rotatably mounted on the inside end portion of a small-diameter part 307 formed in the aforesaid projecting portion of the shaft member 306. The gear 304 is selectively rotated in a predetermined direction shown by an arrow 324 and in a direction shown by an arrow 326 which is opposite to the predetermined direction by the action of a driving source (not shown), as shown in FIG. 11.

Figure 11:
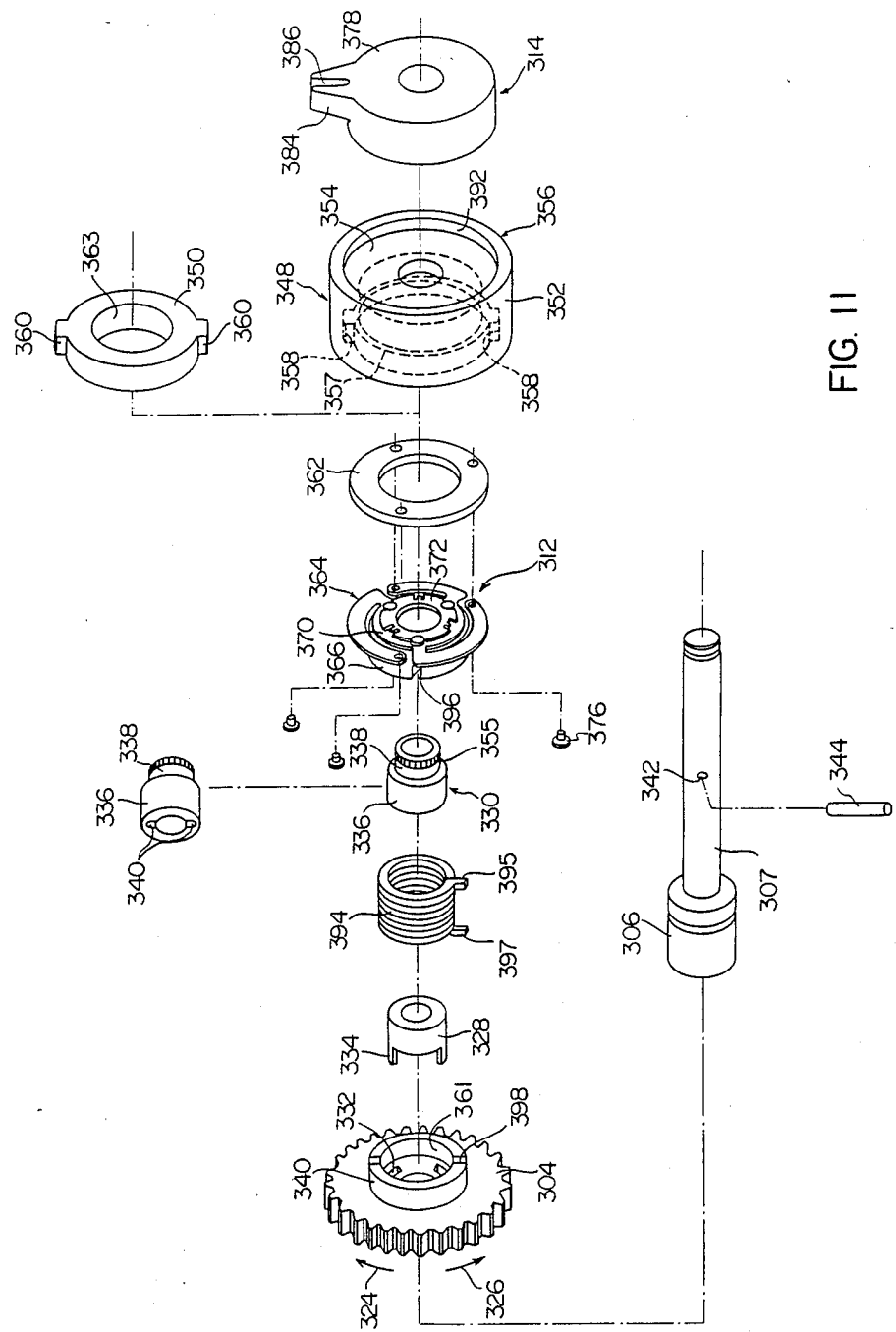
FIG. 11 is a perspective view of the second embodiment shown in FIG. 10 in the exploded state.

With reference also to FIG. 11, the inside transmission means 308 has a first inside member 328 and a second inside member 330. The first inside member 328 is formed of a cylindrical material and mounted so as to rotate as a unit with the gear 304 by inserting its protruding portion 334 provided in its end surface into a through-hole 332 formed in the side surface of the gear 304. The first inside member 328 extends to the right in FIGS. 10 and 11. The first inside member 328 may be formed integrally with the gear 304. The second inside member 330 has a large-diameter portion 336 formed in the left part in FIGS. 10 and 11 and a small-diameter portion 328 provided in the right part. A pair of recesses 340 defining a pin receiving portion are formed in the large-diameter portion 336 of the second inside member 330, and the second inside member 330 is mounted on the small-diameter portion 307 of the shaft member 306 by bringing both end portions of a pin member 344 fitted in a pin hole 342 (FIG. 11) in the small-diameter portion 307 into engagement with the recesses 340 (FIG. 10). The large-diameter portion 336 of the second inside member 330 extends toward the first inside member 328 to the left in FIGS. 10 and 11, and the end surfaces of the two inside members are kept in contact or in proximity with each other. The outside diameter of the first inside member 328 is substantially equal to the outside diameter of the large-diameter portion 336 of the second inside member 330. If desired, the second inside member 330 may be formed as a unit with the shaft member 306.

The outside transmission means 310 has a first outside member 346 and a second outside member 348. The first outside member 346 is formed of an annular boss portion disposed outwardly of the first inside member 328, and provided integrally on one surface of the gear 304 (the right surface in FIGS. 10 and 11). Therefore, the first outside member 346 is also rotated as a unit with the gear 304. The second outside member 348 is provided with an annular first member 350 and a second member 356 having a hollow cylindrical wall 352 and an end wall 354, and in the illustrated embodiment, mounted on the front end portion of the small-diameter portion 338 of the second inside member 330. In the illustrated embodiment, the front end part of the small-diameter portion 338 is serrated, and the end wall 354 of the second member 356 is forced into the serrated portion 355 to form an integral unit. An annular recess 357 is defined in the inner circumferential edge portion of the open end portion (the left end portion in FIGS. 10 and 11) of the hollow cylindrical wall 352 in the second member 356, and a pair of receiving recesses 358 are defined in opposite sites of the inner surface of the annular recess 357. On the other hand, a pair of outwardly projecting engaging protrusions 360 are provided at opposing sites on the outer circumferential surface of the first member 350, and the first member 350 is received in the annular recess 357 and the pair of receiving recesses 358. Accordingly, the second outside member 348 having the first member 350 and the second member 352 is mounted so as to rotate as a unit with the second inside member 330, and therefore with the shaft member 306. As shown in FIG. 10, the first outside member 346 formed in the gear 304 extends toward the first member 350 of the second outside member 348, and the end surfaces of these two members are kept in contact or in proximity with each other as are the two inside members. The inside diameter of the cylindrical inner circumferential surface 361 of the first outside member 346 is substantially equal to &he inside diameter of the cylindrical inner circumferential surface 363 of the first member 350 of the second outside member 348. If desired, the second outside member 348 may be directly mounted on the shaft member 306.

The armature assembly 312 is mounted on the base portion of the small-diameter portion 338 of the second inside member 330 and received in a space defined by the first member 350 and the second member 356 of the second outside member 348. The illustrated armature assembly 312 is comprised of an armature 362, a biasing spring member 364 and a supporting rotating member 366. The supporting rotating member 366 is formed of a short cylindrical material, and mounted rotatably on the small-diameter portion 338 of the second inside member 330. An annular flange 368 projecting to the right is provided integrally in the inner circumferential edge portion of one end portion (the right end portion in FIGS. 10 and 11) of the supporting rotating member 366. Preferably, the supporting rotating member 366 is formed of a light weight plastic material in order to increase the response characteristics of the spring clutch mechanism itself. The armature 362 is formed of an annular plate having an outside shape nearly corresponding to the end wall 354 of the second member 356 and disposed inwardly (on the left side in FIGS. 10 and 11) of the end wall, 354. The armature 362 is mounted on the supporting rotating member 366 via the biasing spring member 364. The biasing spring member 364 is positioned at the annular flange 368 of the supporting rotating member 366, and its annular central portion 370 is fixed to the aforesaid one end surface of the rotating member 366 by a fixing plate 372.

The biasing spring member 364 has a plurality of (three in the illustrated embodiment) projecting portions 374 extending in a sickle shape outwardly from the annular central portion 370, and the free end portion of each of the projecting portions 374 is fixed to the armature 362 by a fixing member 376 such as a rivet. The biasing spring member 364 elastically biases the armature 362 in a direction away from the inner surface of the end wall 354 (functioning as a rotor to be described hereinafter) in the second member 356. The structure of the armature assembly 312 is substantially the same as the armature assemblies 32 and 118 in the first embodiment shown in FIGS. 1 to 7.

The electromagnetic means 314 is disposed outwardly of the outside surface (the right surface in FIGS. 10 and 11) of the end wall 354 of the second member 356. The illustrated electromagnetic means 314 has a field core 378 and an electromagnetic coil 380 mounted on the field core 378, and the field core 378 is rotatably mounted on the front end portion of the small-diameter portion 307 via a sleeve member 382 (see FIG. 10). A projecting portion 384 is provided on the outer circumferential surface of the field core 378, and an engaging recess 386 is formed in its projecting portion 384. On the other hand, an engaging protrusion 388 is provided in the supporting plates 316 by bending part of it, and the engaging protrusion 388 is engaged with the engaging recess 386 of the projecting portion 384 (FIG. 10). Hence, the electromagnetic means 314 is not rotated by the rotation of the supporting shaft 306. In the illustrated embodiment, an engaging member 390 for preventing detachment of the electromagnetic means 314 and other elements from the shaft member 306 is engaged with the front end portion of the small diameter portion 307 of the shaft member 306.

In the illustrated embodiment, an annular protrusion 392 is provided in the outer circumferential edge portion of the end wall 354 in relation to the fact that the electromagnetic means 314 is provided outwardly of the end wall 354 of the second member 356. The annular protrusion 392 projects to the right so as to surround the left end portion in FIGS. 10 and 11 of the electromagnetic means 314. The provision of the annular protrusion 392 in the end wall 354 functioning as a rotor makes it possible to increase the magnetic attracting action of the electromagnetic means 314 and thereby improve the response characteristics of the spring clutch mechanism itself.

The illustrated spring clutch mechanism 302 further includes coil spring means 394. As shown in FIG. 10, the coil spring means 394 is disposed between the inside transmission means 308 and the outside transmission means 310. The coil spring means 394 is fitted over the inside transmission means 308 inwardly of the outside transmission means 310, outwardly of the inside transmission means 308, extends astride the outer circumferential surfaces of the first inside member 328 and the second inside member 330 (more specifically, the large-diameter portion 336). Inwardly of the outside transmission means 310, the coil spring means 394 extends astride the inner circumferential surfaces of the first outside member 346 and the second outside member 348 (more specifically, the first member 350). One end 395 of the coil spring means 394 is connected to the rotating supporting member 366 by inserting it into a cut 396 formed in the other end portion of the rotating supporting member 366 (in the illustrated embodiment, either one of the circumferentially spaced cuts 396). The other end 397 of the coil spring means 394 is connected to the second outside member 346 by inserting it into a cut 398 formed in the second outside member 346 integral with the gear 304 (in the illustrated embodiment, either one of the circumferentially spaced cuts 398). As shown in FIG. 11, the coil spring means 394 is wound from its one end 395 to its other end 397 in the right direction as viewed from the right side in FIGS. 10 and 11. In this winding direction, when a force to hamper the rotation of the supporting rotating member 366 acts on it during the rotation of the gear 304 in the direction of arrow 324 to produce a difference in rotating speed between the gear 304 and the supporting rotating member 366, the coil spring means 394 contracts; and when a force to hamper rotation of the supporting rotating member 366 acts on it during rotation of the gear 304 in the direction of arrow 326 to produce a difference in rotating speed between the two, the coil spring member 394 expands.

Now, with reference mainly to FIG. 10, the operation and effect of the electromagnetically controlled spring clutch mechanism 302 in the second embodiment will be described First, let us assume that by the action of a driving source (not shown), the gear 304 is rotating in a predetermined direction shown by arrow 324 (FIG. 11). In this case, the rotating force of the gear 304 in the direction of arrow 324 is selectively transmitted to the shaft member 306 by the energization and deenergization of the electromagnetic means 314.

When the electromagnetic means 314 is energized during the rotation of the gear 304 in the direction of arrow 324, the armature 362 is moved to the right in FIG. 10 toward the end wall 354 functioning as a rotor against the biasing action of the biasing spring member 364 and magnetically attracted to the inner surface of the end wall 354 of the second member 356 by the action of the electromagnetic means 314. (It is not always necessary to attract the armature 362 to the end wall 354, and it is sufficient if the armature 362 is moved to such an extent as to create a difference in rotating speed between the gear 304 and the supporting rotating member 366). On the other hand, the gear 304 is rotated in the direction of arrow 324, and the armature assembly 312 (consisting of the supporting rotating member 366, the biasing spring member 364 and the armature 362) is rotated likewise via the coil spring means 394. Hence, when the electromagnetic means 314 is energized and the armature 362 is magnetically attracted to the end wall 354 of the second member 356, a force to hamper rotation acts on the supporting rotating member 366. This rotation hampering force creates a difference in rotating speed between the gear 304 and the supporting rotating member 366, i.e., one end 395 of the coil spring means 314 and its other end 397, to contract the coil spring means 394. The coil spring means 394 is contracted by this speed difference as is required. When the coil spring means 394 is so contracted, the inner circumferential surface of the coil spring means 394 acts on the outer circumferential surfaces of the first inside member 328 and the large-diameter portion 336 of the second inside member 330 in the inside transmission means 308, and the first inside member 328 and the second inside member 330 are drivingly connected to each other via the coil spring means 394. As a result, the rotating force of the gear 304 in the direction of arrow 324 (FIG. 11) is transmitted to the shaft member 306 via the first inside member 328, the coil spring means 394 and the second inside member 330 to rotate the shaft member 306 in the direction of arrow 324 incident to the rotation of the gear 304.

On the other hand, when the electromagnetic means 314 is deenergized, the armature 362 is moved to the left in FIG. 10 by the elastic biasing action of the biasing spring member 364, and the above connection between the armature 362 and the end wall 354 of the second member 356 is cancelled (namely, the armature 362 is returned to the position shown in FIG. 10 by the action of the biasing spring member 364). As a result, the elastic force of the coil spring means 394 which is created during transmission of the driving force as stated above causes the supporting rotating member 366 to rotate slightly further in the direction of arrow 324, and the coil spring means 394 is properly expanded. On expansion, the driving connection between the first inside member 328 and the second inside member 330 by the coil spring means 394 is cancelled to thereby stop the rotation of the shaft member 306 in the direction of arrow 324.

When the gear 304 is rotating in the direction of arrow 326 which is opposite to the predetermined direction described above by the action of a driving source (not shown), the rotating force of the gear 304 in the direction of arrow 326 is transmitted selectively to the shaft member 306 by the energization and deenergization of the electromagnetic means 314.

When the electromagnetic means 314 is energized during the rotation of the gear 304 in the direction of arrow 326, the armature 362 is moved to the right in FIG. 10 toward the end wall 354 functioning as a rotor against the biasing action of the biasing spring member 364 and magnetically attracted to the inner surface of the end wall 354 of the second member 356 by the action of the electromagnetic means 314. At this time, the gear 304 is rotated in the direction of arrow 326, and the armature assembly 312 consisting of the supporting rotating member 366, the biasing spring member 364 and the armature 362 is rotated likewise via the coil spring means 394. Hence, when the electromagnetic means 314 is energized and the armature 362 is magnetically attracted to the end wall 354 of the second member 356, a force hampering the rotation of the supporting rotating member 366 acts on it. As a result, the rotation hampering force produces a difference in rotating speed between the gear 304 and the supporting rotating member 366, i.e., one end 395 of the coil spring means 314 and its other end 397, and this speed difference causes proper expansion of the coil spring means 394. On expansion, the outer circumferential surface of the coil spring means 394 acts on the inner circumferential surfaces of the first outside member 346 and the second outside member 348 (more specifically, the first member 350) in the outside transmission means 310, and the first outside member 346 and the second outside member 368 are drivingly connected to each other via the coil spring means 394. As a result, the rotating force of the gear 304 in the direction of arrow 326 is transmitted to the shaft member 306 via the first outside member 346, the second outside member 348 (i.e., the first member 350 and the second member 356) and the second inside member 330 to rotate the shaft member 306 in the direction of arrow 326 incident to the rotation of the gear 304.

On the other hand, when the electromagnetic means 314 is deenergized, the armature 362 is moved to the left in FIG. 10 by the elastic biasing action of the biasing spring member 364, and the above connection between the armature 362 and the end wall 354 of the second member 356 is cancelled (namely, the armature 362 is returned to the position shown in FIG. 10 by the action of the biasing spring member 364). As a result, the elastic force of the coil spring means 394 which is created during transmission of the driving force mentioned above further rotates the supporting rotating member 366 slightly, and properly contracts the coil spring means 394. Upon contraction, the driving connection between the first outside member 346 and the second outside member 348 by the coil spring means 394 is cancelled, and the rotation of the shaft member 306 in the direction of arrow 326 is stopped.

In the electromagnetically controlled spring clutch mechanism 302 described above, the driving force of the gear 304 in the direction of arrow 324 is transmitted to the shaft member 306 by utilizing the contraction of the coil spring means 394, and the driving force of the gear 304 in the direction of arrow 326 is transmitted to the shaft member 306 by utilizing the expansion of the coil spring means 394. Hence, the rotation of the gear 304 in the predetermined and reverse directions can be properly transmitted to the shaft member 306 by controlling the electromagnetic means 314. It will be readily seen by comparing FIG. 1 with FIG. 10 that in the second embodiment, the structure of the spring clutch mechanism 302 itself can be simplified and the entire spring clutch mechanism 302 can be made compact as compared with the first embodiment.

When the coil spring means 394 in the electromagnetically controlled spring clutch mechanism 302 has an outside diameter of, for example 10 to 16 mm, excellent response characteristics can be obtained by setting the distance between the inner circumferential surface of the coil spring means 394 and the outer circumferential surfaces of the first inside member 328 and the large-diameter portion 336 of the second inside member 330 at about 0.075 mm (namely, the difference between the inside diameter of the coil spring means 394 and the outside diameter of the first inside member 328 and the large-diameter portion 336 of the second inside member 330 becomes about 0.15 mm) and the distance between the outer circumferential surface of the coil spring means 394 and the inner circumferential surface of the first outside member 346 and the first member 350 of the second outside member 348 at about 0.075 mm (namely, the difference between the outside diameter of the coil spring means 394 and the inside diameter of the first outside member 346 and the first member 350 of the second outside member 348 becomes about 0.15 mm). This preset distances may slightly vary depending upon the size of the coil spring means 394, etc.

In the illustrated embodiment, the end wall 354 of the second member 356 of the second outside member 348 acts as a rotor. Alternatively, a rotor may be separately disposed opposite to the armature.

The electromagnetically controlled spring clutch mechanism 302 in the second embodiment may conveniently be applied to a massager machine, for example, as in the first embodiment shown in FIGS. 1 to 7.

What I claim is:

1. An electromagnetically controlled spring clutch mechanism comprising a rotatably mounted output rotating element, an input rotating element rotatable relative to the output rotating element and adapted to rotate in a predetermined direction and in a direction opposite to the predetermined direction, inside transmission means and outside transmission means interposed between the input rotating element and the output rotating element, the inside transmission means comprising a first inside member adapted to rotate as a unit with the input rotating element and a second inside member adapted to rotate as a unit with the output rotating element, the outside transmission means comprising a first outside member adapted to rotate as a unit with the input rotating element and a second outside member adapted to rotate as a unit with the output rotating element, coil spring means disposed between the inside transmission means and the outside transmission means and extending astride the first and second inside members of the inside transmission means outwardly of outer circumferential surfaces of the first and second inside members and astride the first and second outside members of the outside transmission means inwardly of inner circumferential surfaces of the first and second outside members, and electromagnetic means for producing a difference in rotating speed between one and another end of the coil spring means; wherein when the electromagnetic means is energized during the rotation of the input rotating element in said predetermined direction, a difference in the rotating speed in a direction to contract the coil spring means is created between the one end and the other end of the coil spring means to connect the first and second inside members drivingly via the coil spring means and thereby transmit the rotating force of the input rotating element in said predetermined direction to the output rotating element via the inside transmission means, and when the electromagnetic means is energized during rotation of the input rotating element in said opposite direction, a difference in the rotating speed is created between the one and the other end of the coil spring means in a direction to expand the coil spring means to connect the first and second outside members drivingly via the coil spring means and thereby transmit the rotating force of the input rotating element in said opposite direction to the output rotating element via the outside transmission means, a rotor adapted to rotate as a unit with the output rotating element and an armature assembly rotatable relative to the output rotating element; said armature assembly including an armature positioned opposite to one surface of the rotor, a supporting rotating member mounted rotatably on the output rotating element, and a biasing spring member interposed between the supporting rotating member and the armature and adapted to bias the armature elastically in a direction away from said one surface of the rotor; said electromagnetic means, when energized, magnetically attracting the armature to said one surface of the rotor.

2. The electromagnetically controlled spring clutch mechanism of claim 1 wherein each of the first and second inside members of the inside transmission means has a cylindrical outer circumferential surface, and when contracted, the coil spring means acts on the outer circumferential surfaces of the first and second inside members and drivingly connects the first and second inside members to each other.

3. The electromagnetically controlled spring clutch mechanism of claim 1 wherein each of the first and second outside members of the outside transmission means has a cylindrical inner circumferential surface, and when expanded, the coil spring means acts on the inner circumferential surfaces of the first and second outside members and drivingly connects the first and second outside members to each other.

4. The electromagnetically controlled spring clutch mechanism of claim 1 wherein the coil spring means is wound from its one end linked to the supporting rotating member its other end linked to the input rotating element in such a direction that it is contracted when the electromagnetic means is energized during the rotation of the input rotating element in said predetermined direction, and it is expanded when the electromagnetic means is energized during rotation of the input rotating element in said opposite direction.

5. The electromagnetically controlled spring clutch mechanism of claim 1 wherein the rotor also constitutes part of the second outside member of the outside transmission means.

6. The electromagnetically controlled spring clutch mechanism of claim 10 wherein an annular protrusion projecting so as to surround the electromagnetic means is provided in the outer circumferential edge portion of the rotor.

* * * * *